P. E. EKMAN.
COMBINATION CENTERHEAD, LEVEL, AND BEVEL PROTRACTOR.
APPLICATION FILED MAR. 19, 1912.
1,063,342.
Patented June 3, 1913.
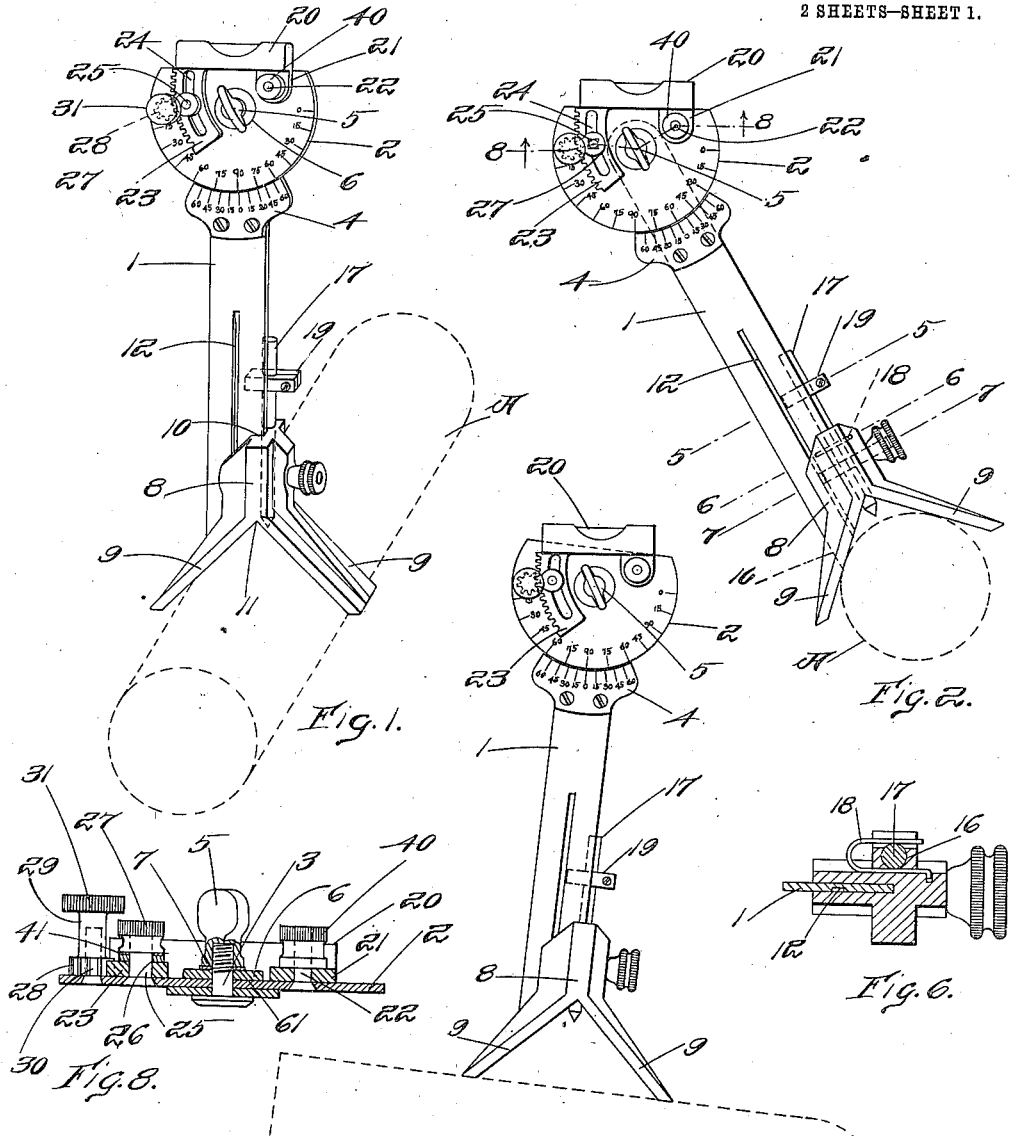

P. E. EKMAN.
COMBINATION CENTERHEAD, LEVEL, AND BEVEL PROTRACTOR.
APPLICATION FILED MAR. 19, 1912.
1,063,342.
Patented June 3, 1913.
2 SHEETS—SHEET 2.
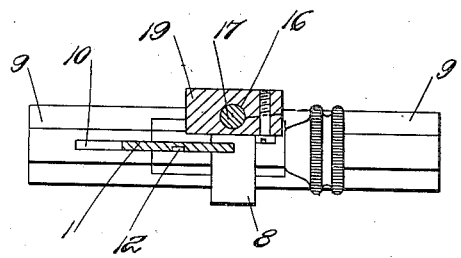
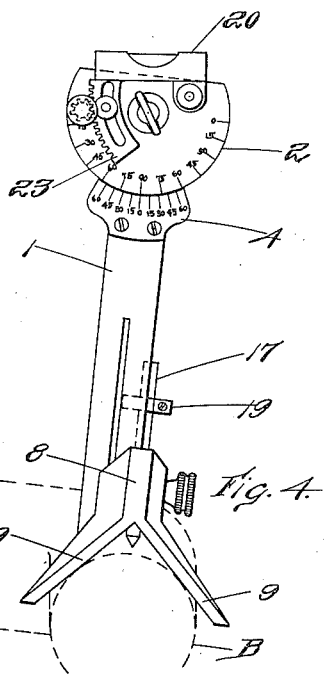
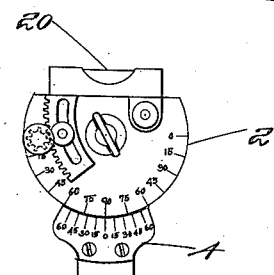
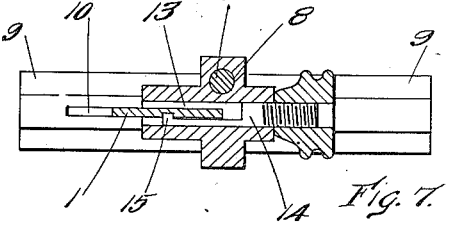
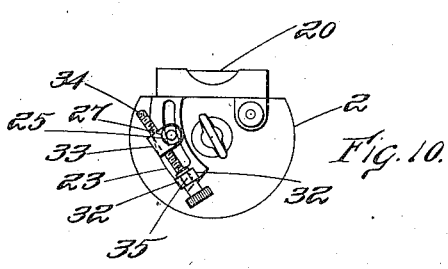
Witnesses:
John H. Parker
R. Wallace
Inventor:
Per Erik Ekman
by Macleod, Calver, Copeland & Dike
Attorneys.

UNITED STATES PATENT OFFICE.

PER ERIK EKMAN, OF WOBURN, MASSACHUSETTS.

COMBINATION CENTERHEAD, LEVEL, AND BEVEL-PROTRACTOR.

1,063,342.

Specification of Letters Patent.    Patented June 3, 1913.

Application filed March 19, 1912. Serial No. 684,758.

*To all whom it may concern:*

Be it known that I, PER ERIK EKMAN, a citizen of the United States, residing at Woburn, county of Middlesex, State of Massachusetts, have invented a certain new and useful Improvement in Combination Centerheads, Levels, and Bevel-Protractors, of which the following is a specification, reference being had therein to the accompanying drawings.

The invention relates to a new and useful combination of centerhead, level and bevel protractor.

In the use of centerheads with bevel protractors in common use, where it is desired to lay out a line for a keyway or groove or for a series of holes in a line on a rod which is inclined to the bed or table or which is bent so as to form two arms in different planes and it is desired to form the groove or series of holes in one arm in a line which is at the same angle to the horizontal as a groove or line of holes in the other arm, it is difficult to lay out the line correctly.

The object of this invention is to provide an attachment whereby the line for the holes or keyway or groove may be laid out conveniently and with close accuracy.

The invention will be fully understood from the following description taken in connection with the accompanying drawings, and the novel features will be pointed out and clearly defined in the claims at the close of the specification.

In the drawings: Figure 1 is a perspective view of a device embodying the invention in combination with a prick punch and placed in position on a rod ready for the prick punch to be struck. Fig. 2 is a front elevation of the device shown in Fig. 1 but with the blade and the centerhead tipped at an angle, the level and the protractor being still in the horizontal position. Fig. 3 is a front elevation of the device standing on an inclined arm of an angle bar, the level being horizontal and the blade and the protractor being in their normal position with relation to each other. Fig. 4 shows the device adjusted as in Fig. 3 but straddling the other arm of the angle bar shown in Fig. 3. Fig. 5 is a cross section on line 5—5 of Fig. 2 enlarged. Fig. 6 is a cross section on line 6—6 of Fig. 2 enlarged. Fig. 7 is a cross section on line 7—7 of Fig. 2 enlarged. Fig. 8 is a section on line 8—8 of Fig. 8. Fig. 9 is a front elevation of a device embodying the invention illustrating the use of an angle bar to determine the location for a groove. Fig. 10 is a front elevation of a protractor and level showing a modified form of means for adjusting the level with relation to the protractor. Fig. 11 is a section on line 11—11 of Fig. 9.

Referring now to the drawings: 1 is the blade to which the protracting sector 2 is pivoted on the pivot 3. The protractor sector 2 is graduated around its edge, in any suitable way. As shown, the graduation begins with 90° at the bottom and is graduated therefrom on both sides to 0°. Preferably a vernier 4 is employed also but not necessarily. Means are provided whereby the protractor may be maintained at any angle to the blade to which it is adjusted. The means shown consists of a nut 5 tapped out to engage with the threaded end of the pivot 3. A washer 6 with non-circular hole fitting over a non-circular portion of the pivot 3 between the sector and the shoulder 7 on the nut 5 enables the clamp nut to bind the protractor in its adjusted position. Preferably a spring washer 61 is also employed.

A centerhead 8 is formed with the two diverging legs 9, 9, in usual manner, one side of the head 8 being formed with a vertical groove or slot 10 to receive the blade 1. This groove extends in as far as the crotch 11 between the legs 9, 9, and when the legs stand on a horizontal table the inner wall of the groove will be vertical, so that when the blade 1 is inserted into the groove and the legs rest on a horizontal table the inner edge of the blade will be vertical and in line with the vertex 11 of the crotch formed by the legs.

A vertical groove 12 is formed in one face of the blade 1. A hole 13 extends horizontally through the centerhead 8, intersecting the vertical groove 10 in the head. A key 14 is formed with a stem adapted to pass through the hole 13, being flatted on one side to clear the blade 1 and having at its end a lateral projection or shoulder 15 which engages with the groove 12 in the blade and serves to tighten the blade in the head.

A vertical hole 16 is formed in the head 8 of the stock intersecting the vertex 11 of the crotch. A plunger in the form of a prick punch 17 fits in said hole 16 with a sliding fit and is frictionally held in any place to which it is adjusted by a spring 18 which engages one side of the punch. The tension of this spring is such that it will hold the punch in any adjusted position but will allow the punch to slide under pressure of a blow on the punch.

If by chance the point of the punch is a little off center as it may sometimes be by imperfect grinding or otherwise, and if after one prick is made and the instrument is moved along to make the succeeding pricks in the rod and the punch is allowed to turn in its bearings before the second prick is made, then the pricks will not be in the proper relative position. If, however, the punch is so held that it cannot turn then the pricks will all be in the same relative position even if the point is a little off center and for some classes of work this will be sufficient. In order to serve as a guide that the point shall always be in the same relative position, I provide a block 19 which is clamped to the punch and the operator may guide this with relation to the blade so that the point of the punch may always be maintained in the proper relative position, near enough for all practical purposes.

A level 20 is adjustably mounted on the protractor 2, being formed with an arm 21 at one end which is pivotally connected with the protractor by a pivot 22 on which the level may be turned in a vertical plane to adjust it with relation to the protractor. The end of the pivot is screw-threaded to receive a binding nut 40. Means are provided whereby the level may be turned on this pivot and held in its adjusted position. One means is that shown in Figs. 1 and 4. This means is as follows: The swinging end of the level is formed with an arm 23 in which is a curved guide slot 24 formed on the arc of a circle at the center of which is the pivot 22. A guide pin 25 projects from the face of the protractor through the said guide slot. A washer 26 is fitted over said guide pin and a binding nut 27 is screwed onto the threaded end of the guide pin. Preferably a spring washer 41 is also employed. By setting up the nuts 27 and 40 the arm 23 and the level 20 may be clamped in any position to which they are adjusted. A pin 30 projects from the face of the protractor. The edge of the arc-shaped arm 23 is formed with teeth which are engaged by a pinion 28 formed on a barrel 29 which fits over the pin 30, said barrel being formed with a head 31 whereby the pinion may be rotated to adjust the level.

A modified form of adjusting mechanism for the level is shown in Fig. 10. A fork 32 is formed with a shank which is screwed into the lower end of the arm 23 and extends at right angles to the face of the protractor. A swivel block 33 is formed with a hole which is loosely engaged by the pivot pin 25. A nut 27 and washers similar to those previously described in connection with Fig. 1 are employed. A screw-threaded pin 34 engages with a tapped out hole passing through the swivel block 33 at right angles to the direction of the hole which is engaged by the pin 25, said pin 34 having a neck portion 35 formed between two shoulders, said neck portion engaging with the branches of the fork 32. By turning the screw 34 the arm 23 will be moved in one direction or the other according to the direction of rotation of the screw pin 34, thereby swinging the level on its pivot. When the zero mark on the vernier points to 90° on the protractor the straight edge of the level will be parallel with the straight edge on the top of the protractor and if the instrument is standing on a horizontal table the level will be in a horizontal position, while the blade will be in a vertical position.

When the device is to be used for determining the location of a groove a slidable bar 36 is employed having a foot 37.

In the operation of the device if a line for a series of vertical radial holes is to be laid out on a rod A which lies horizontally, the centerhead is placed upon the rod as shown in Fig. 1 with the 90° mark of the protractor in alinement with the zero mark of the vernier, the level 20 being in a horizontal position. The prick punch 17 will then be given a tap with a hammer to force it down and cause the point of the punch to prick the rod. Then in a similar way another point will be marked on the rod. A line connecting these points will be in a vertical plane passing through the axis of the rod.

If it is desired to mark a series of points in line on a cylindrical surface and at a certain angle to a vertical plane, as for instance at an angle of 30°, then the protractor 2 will be turned on its pivot to bring the 60° mark on the protractor against the zero mark on the vernier, thus making a turn of 30°. The level will still be retained parallel with the straight edge of the upper side of the protractor. The centerhead will then be placed with its legs straddling the rod A, as shown in Fig. 2, in such position that the level is horizontal and in this position the blade 1 and the prick punch 17 will extend in a direction at an angle of 30° to the vertical. By means of the prick punch 17 additional points will be pricked in the rod A in a straight line with the first point.

Suppose it is desired to locate a series of points for holes in an arm B of an angle bar B, C, in which the arm C is inclined to the horizontal and it is desired that the holes which are to be drilled in the arm B shall extend radially therein at the same angle to the horizontal that the arm C is inclined to the horizontal. The operation and the use of the instrument will be as follows: (See Figs. 3 and 4.) First the instrument will be placed on the arm C, both legs on the top of the arm C, as shown in Fig. 3, instead of straddling it, and the level 20 will be turned by its adjusting mechanism into a horizontal position, as shown in Fig. 3. The instrument then will be removed from the arm C, leaving the level and the protractor in the same relative position to which they have just been adjusted and the legs will then be straddled upon the arm B, as shown in Fig. 4, in such position that the level 20 will be horizontal and the blade 1 and prick punch 17 will then stand at the same inclination to the perpendicular that they are in Fig. 3. If now the prick punch is struck so as to prick the arm B and then the device is shifted so as to prick the arm B in one or more additional places in its length, with the level still in the horizontal position, the several pricks will be in a straight line and a series of holes may be drilled therein or a keyway may be cut guided from the line of the pricks. If these holes are drilled radially to the arm B these holes will extend at the same angle to the vertical that the arm C is to the horizontal, that is, the said holes will be in a plane at right angles to the arm C.

When it is desired to use the instrument for determining the location for a groove an angle bar or gage bar 36, as shown in Fig. 9, may be employed. The angle bar is inserted in the inner side of the blade slot before the blade 1 is inserted, and then said blade 1 is inserted alongside of the bar 36, as shown in Fig. 9. As a simple form of illustration of the use of the device, suppose it is desired to cut a groove in a rod placed in a horizontal position, as shown in Fig. 9. The holder for the rod and the cutting mechanism are not shown in the drawings because they are well known in the art. The usual form of holder, however, is a suitable frame for holding the rod in proper relation to the cutter and adjustable with relation to the cutter both in the line of the travel of the cutter and at right angles thereto. The cutter usually employed is a rotary cutter which either travels in the lengthwise direction of the groove which is to be cut or if the cutter is stationary the carriage on which the rod holder is supported travels in relation to the cutter in a lengthwise direction. The cutter should be just twice the width of the lateral extension or offset of the foot 37 as measured from the right-hand edge of the vertical portion of the bar 36, as shown in Fig. 9, that is, as measured from a vertical line passing through the apex of the crotch formed by the two legs 9—9. Suppose the groove is to be cut lengthwise of the rod and it is desired that the two sides of the groove be parallel to each other and at equal distances from a vertical plane passing through the axis of the rod. Now the operator will adjust his table and cutter with relation to each other as he can best judge by his eyes for the cutter to make the groove in the central location above described. He will then operate the cutter enough to just start a groove in the rod. Then he will move the table slightly in a lengthwise direction of the rod so as to withdraw the rod from the cutter and apply my instrument to determine if the groove has been started in the right place. The dotted lines 38 and 39 in Fig. 9 represent the two sides of the groove which has thus been started. Before applying the instrument it should be placed on the plane or base of the rod holder to register the level 20 with the said plane or base. The instrument is now applied, as shown in Fig. 9, straddling the rod and in such a position that the toe of the foot 37 will engage the side 38 of the groove which has previously been started by the cutter. If when in that position the instrument level shows horizontal, it will indicate that the groove is started in the right location and the instrument will be removed from the rod and the table will be again brought into position with relation to the cutter for the cutter to finish cutting the groove. If, however, when the test is made the instrument level shows out of horizontal, it will indicate that the groove is started in the wrong location. In that case the instrument will be removed, and the table and cutter readjusted with relation to each other so as to start the groove again as nearly as the eye of the operator can determine to make the correction required. The rod will again be moved away from the cutter so that the instrument can be applied as in the previous test, and if necessary the same process will be repeated until the instrument shows that the groove has been started in the right location. If it is desired to have another groove cut on the rod parallel with the first groove and extending radially at a certain angle to the radial direction of the first groove, as for instance 30 degrees, the protractor should be moved 30 degrees without however moving the level with relation to the protractor, thus giving to the level a tilt of 30 degrees. During the operation of the cutter the rod should be clamped or otherwise secured against movement in the holder. The clamping mechanism should now be loosened to permit the rod to be turned on its axis. The rod should then be turned on its axis a sufficient distance so that when the instrument is applied to the rod with the toe of the foot engaged with the side 38 of the groove, the level will show horizontal, which indicates that the rod has been turned through the required angle, 30 degrees. The rod should then again be tightened in the holder. The table will then be drawn up to bring the rod to the cutter and the machine operated to cut the groove, which by reason of the use of the instrument, as already described, will be 30 degrees from the first groove.

If it is desired to cut a groove of a different width a different angle bar will be used, having a foot of a different lateral extension according to the width of the groove to be cut.

By making the toe of the foot downwardly inclined the end of the toe of the foot can be brought into engagement with the side 38 of the groove without bringing the heel of the foot into the groove. This is clearly illustrated in Fig. 9. For this reason the upright portion of the angle bar may be made wider, and therefore stiffer, than could be done if the foot extended at right angles with the upright portion. Another advantage of making the toe of the foot downwardly inclined is that as the sides of the crotch formed by the diverging legs 9—9 are inclined to each other the foot can be drawn farther up into the crotch than could be done if the foot extended at right angles to the vertical portion of the angle bar, as will be evident from inspection of Fig. 9, the upper side of the foot 37 being parallel or nearly parallel with the inclined face of one of the legs 9. Thus the device is adapted for use in testing grooves cut on circular stock of smaller diameter than if the foot were at right angles with the upright portion of the angle bar.

By the use of my device it is not necessary to mark a row of pricks to indicate the line of the groove.

It is obvious that there are numerous other ways in which the device may be used, the various methods of use above described being merely illustrative, and it is not intended that the invention shall be limited to any particular use, but it is intended that the claims shall cover the device itself, whatever use may be made of it.

What I claim is:

1. A centerhead and bevel protractor having a blade, a sector-shaped protractor pivotally connected to the blade at the center of curvature of the protractor, a level pivotally connected at one end to the protractor, said level being capable of being turned on its pivot, means for turning the said level on its pivot with relation to the protractor and means for retaining the level in its adjusted position.

2. A centerhead and bevel protractor having a blade, a protractor pivotally connected therewith, a level mounted on the protractor, a stock with a guideway to receive said blade, and a bar also mounted in said guideway having a gage foot projecting therefrom.

3. A centerhead and bevel protractor having a protractor, a level having at one end an arm which is pivotally connected to the protractor, the other end of the level having an arm with an arc-shaped slot on a curve of which said pivot is the center, a stud projecting from said protractor through said slot and means connected with said stud and with said arc shaped arm whereby the arc-shaped arm may be actuated to move the level on its pivot.

4. A centerhead and bevel protractor having a protractor, a level having at one end an arm which is pivotally connected to the protractor, the other end of the level having an arm with an arc-shaped slot on a curve of which said pivot is the center, said arc-shaped arm having teeth on its periphery and a pinion engaging with said teeth whereby said arc-shaped arm may be actuated.

5. In combination with a center head having diverging legs, a gage bar having a toe guided by the center head, the outer end of the toe of the gage bar serving to engage the side of a groove, the toe of said foot being downwardly inclined from the heel of the foot so that the toe may extend down against the side of the groove in the stock while the heel of the foot is above the groove, said downwardly inclined form of the foot permitting the foot to be drawn into the crotch while still permitting the extreme end of the foot to engage the groove to adapt it for stock of small diameters.

In testimony whereof I affix my signature, in presence of two witnesses.

PER ERIK EKMAN.

Witnesses:
WILLIAM A. COPELAND,
ALICE H. MORRISON.